Nov. 18, 1930.   C. H. BERGQUIST ET AL   1,781,744
FLUID METER
Filed July 9, 1926   3 Sheets-Sheet 1

Inventor
CHARLES H. BERGQUIST,
RICHARD BATTLE,
By
Attorney

Nov. 18, 1930.   C. H. BERGQUIST ET AL   1,781,744
FLUID METER
Filed July 9, 1926   3 Sheets-Sheet 2
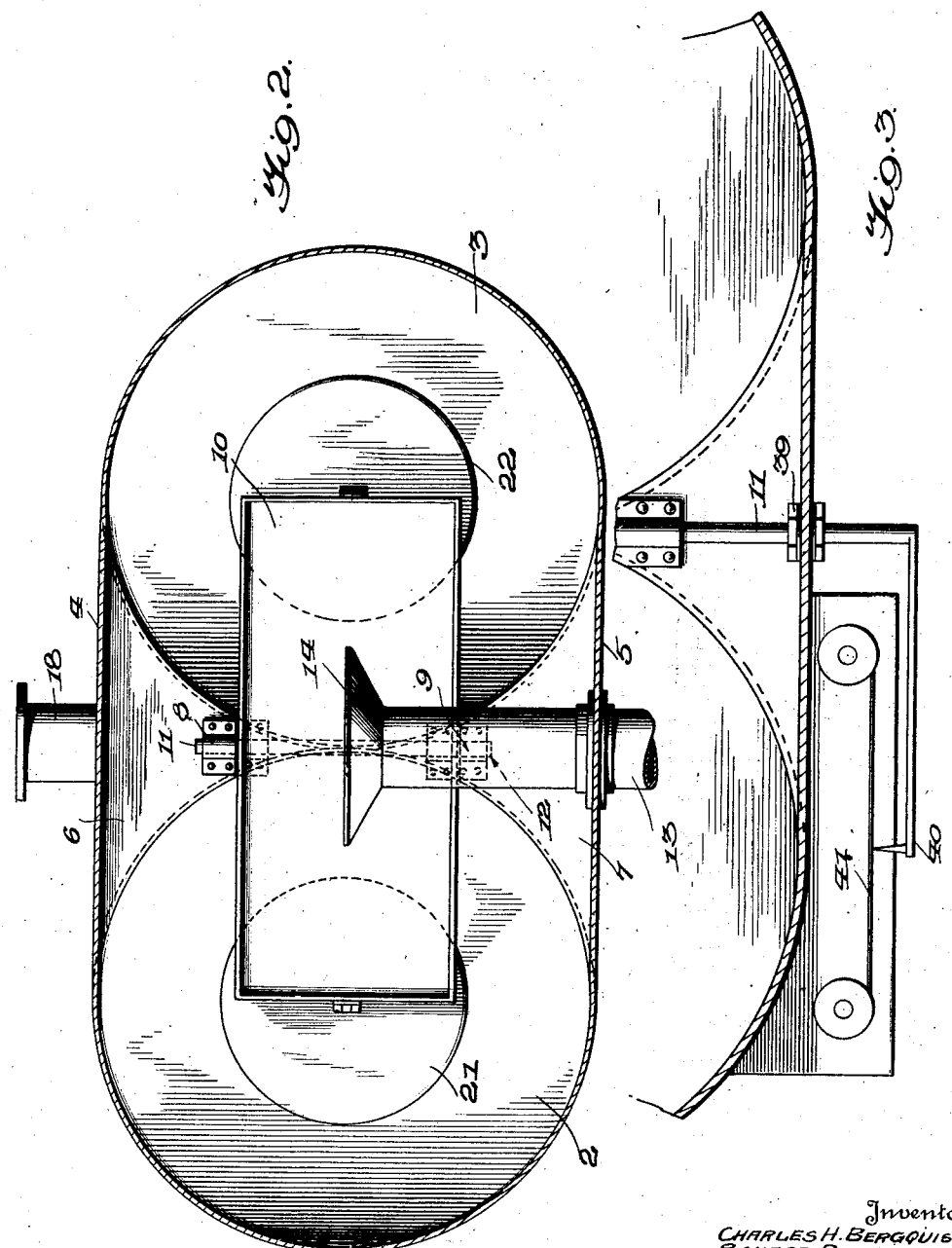
Inventor
CHARLES H. BERGQUIST,
RICHARD BATTLE,
By
J. G. Quesada
Attorney Nov. 18, 1930. C. H. BERGQUIST ET AL 1,781,744
FLUID METER
Filed July 9, 1926   3 Sheets-Sheet 3
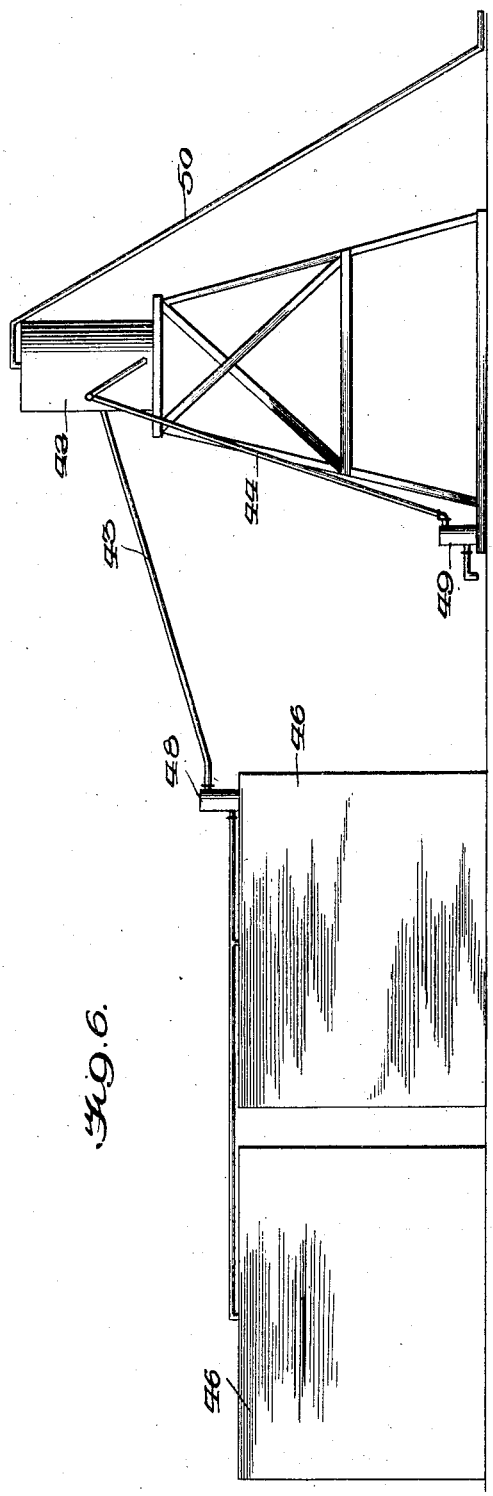
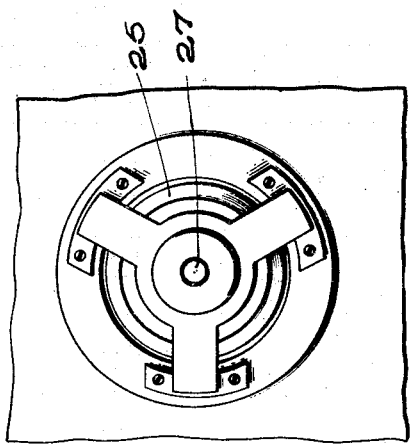
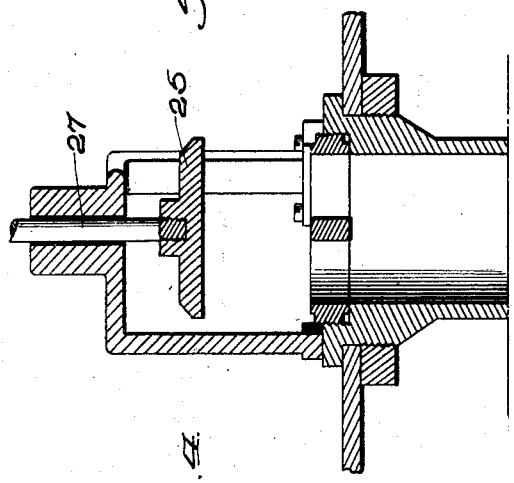
Inventor
CHARLES H. BERGQUIST,
RICHARD BATTLE
By
Attorney Patented Nov. 18, 1930

1,781,744

UNITED STATES PATENT OFFICE

CHARLES H. BERGQUIST AND RICHARD BATTLE, OF OKMULGEE, OKLAHOMA

FLUID METER

Application filed July 9, 1926. Serial No. 121,415.

This invention relates to fluid meters and particularly to gravity operated meters for measuring the quantity flow of liquids. It proposes the construction of a meter of that type which operates by the alternate filling and discharge of vessels of known capacity and registering of the count of the filling or discharge operations, usually expressed in terms of the quantity of liquid measured.

The principal object of the present invention is the provision of actuating means for the registering mechanism including a balanced device for conveying liquid from a source to one of a pair of measuring vessels, said device being adapted upon the inundation of a part thereof by the liquid accumulating in said vessel, to tilt, diverting the liquid into the other vessel, at the same time effecting the discharge of the liquid from the first vessel, the teetering of the balanced device repeatedly alternating between the vessels for the duration of the measuring period.

Another object of the invention is the provision of means for delivering an inertia blow to the discharge valves in the vessels for opening said valves, whereby a small unbalanced force is able to overcome in a positive and certain manner the head of liquid above said valves, represented by the depth of liquid in the vessels.

And the invention has for its further object in its specific application to the measurement of the common flow of non-miscible liquids such as oil and water, the separation and measurement of the proportionate flow of each of said liquids.

Other objects of the invention will appear as the following description of a preferred embodiment thereof proceeds.

In the accompanying drawings forming a part of this application like numerals are employed to designate like parts throughout the same.

Figure 2 is a section taken along line 2—2 of Figure 1.

Figure 3 is a horizontal section showing in plan the time-controlled recording device.

Figure 4 is a vertical section through the valve and co-operating parts.

Figure 5 is a plan view of the structure shown in Figure 4.

Figure 6 is a side elevation showing a system for measuring proportionate flow of the constituents of a stream of non-miscible liquid.

Figure 1:
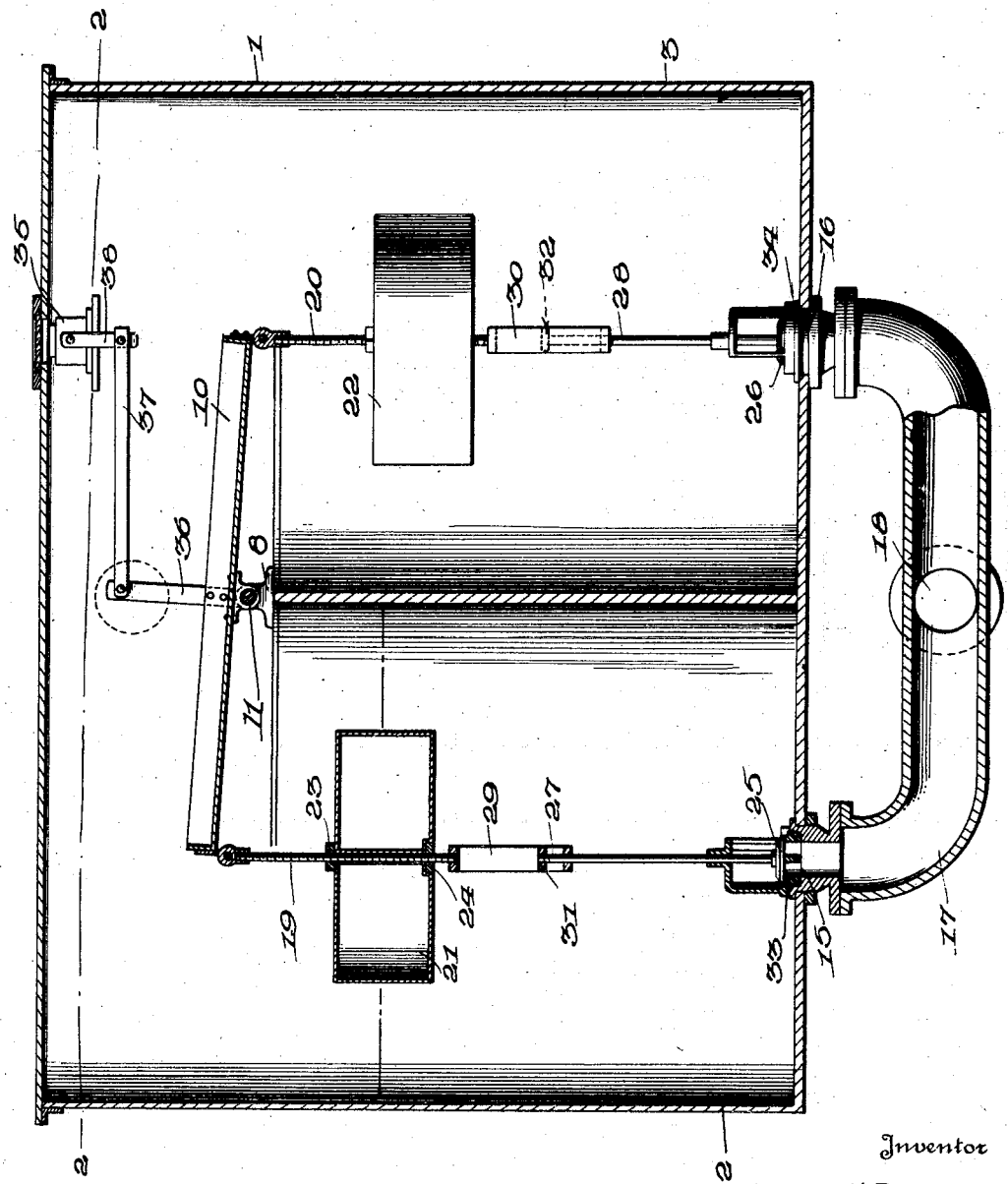
Figure 1 is a vertical section, showing the discharge manifold partly in elevation.

Referring now in detail to the several figures the numeral 1 represents, in general, the casing of the meter which is preferably formed as a single receptacle in its upper part, and separated in its lower part into separate vessels 2 and 3. This may be conveniently done, as shown in the drawing by making two cylindrical tanks, placing them side by side in substantial contact, slitting them along the line of contact down as far as it is desired that the common portion of the casing shall extend, cutting the walls of said vessel circumferentially in the plane of the lower end of the slit to an angular distance of ninety degrees from said slit and then opening the upper cut portions until they come together in the tangential sides 4 and 5. Plates 6 and 7 are fitted to fill the space between the cylindrical portion of the casing and the upper oval portion, all the joints being welded or otherwise secured together in any suitable or satisfactory manner. Bearings 8 and 9 are suitably supported upon the plates 6 and 7 and a shallow box or trough is pivotally mounted in said bearings by means of trunnions 11 and 12 so that it may teeter and spill its contents into one or the other of the vessels 2 and 3.

An inlet pipe 13 delivers the liquid to be measured from a suitable source, in the present instance an oil well, to the trough 10, preferably through a relatively wide distributing nozzle 14. The vessels 2 and 3 are provided at their bottoms with valve controlled discharge openings 15 and 16, the same being preferably connected by a manifold 17 with a single discharge pipe 18 leading to a suitable storage tank.

Threaded rods 19 and 20 pivotally depend from the ends of the trough 10. Floats 21 and 22 are carried by said rods and their height above the bottom of the vessels may be adjusted by means of upper and lower nuts 23 and 24 engaging the threads upon the respective rods.

The discharge openings 15 and 16 are controlled by valves 25 and 26 respectively, having threaded stems 27 and 28 in substantial alinement with the rods 19 and 20. The valve stems are of such length that a space exists between the ends of said valve stems and the ends of said rods, said spaces being bridged by yokes 29 and 30 carried at the ends of said rods and having apertured lower ends through which the valve stems may freely telescope. The valve stems are provided with nuts 31 and 32 of larger size than the diameter of the apertures in the ends of the yokes so that the valve stems are retained by said yokes and in certain positions of the trough 10 are lifted from their seats by said yokes. When the trough 10 is in balanced relation both valves rest in closed position upon their seats 33 and 34. Any desired means, not shown may be employed for initially overbalancing the trough, a simple expedient being to make one side of the trough slightly heavier than the other to give the trough a slight bias in one direction upon initial operation of the meter.

When oil is delivered to the trough it flows down the same in the direction in which trough is initially biased, discharging for instance, into the vessel 2. This vessel then fills up to the level of the float, and at a certain critical level of the liquid in said vessel, the float becomes sufficiently buoyant to overcome the bias of the trough so that the latter teeters in the other direction with the body of oil therein contained. The flow of the oil to the opposite end of the trough permits the latter to gather inertia in its swing, raising the float 21 and pulling up the yoke 29 relatively to the valve stem 27, so that the lower end of the yoke strikes a hammer blow against the nut 31 suddenly throwing the valve 25 from its seat and initiating the discharge of liquid from the vessel 2. The nut 31 is preferably made adjustable along the valve stem 27 so that the amount of play between the lower end of the yoke 29 and the valve stem, and consequently the force of the inertia below may be determined to best advantage.

The vessel 3 continues to fill while the vessel 2 is discharging and when the float 22 is sufficiently inundated the trough 10 reverses its position, and this oscillatory movement of the trough continues throughout the duration of the measuring period.

It is particularly pointed out that the operation of this meter is independent of the specific gravity of the fluid measured, since the liquid in the trough which the float must lift is the same liquid which buoys up the float.

Care is taken to have discharge openings 15 and 16 larger than the cross section of the inlet pipe so as to insure the complete discharge of each vessel before filling of the same recommences. Each oscillatory movement of the trough 10 is registered by means of appropriate registering mechanism 35 of conventional construction and which it is not thought necessary to show in detail.

Said registering mechanism 35 is connected with the trough so as to respond to movements thereof, by suitable linkage which may consist of an upright member 36 rigidly connected to said trough and a link 37 pivotally connected to said upright and to a lever 38 operatively associated with the registering mechanism. It may be desirable at times to record the time during which the measuring operation takes place, for which purpose one of the trunnions, for instance the trunnion 11 may be extended beyond the side of the casing as shown in Figure 3 through a light stuffing box 39, the projecting end of said trunnion, carrying a suitable stylus 40, operating against a clock actuated chart 41.

In Figure 6, we have shown the combination of my novel meter with separating means so that the common flow of a stream of non-miscible liquids may be separated into its constituent parts, and these parts separately measured to obtain the proportionate quantities of said liquids in the common flow.

The separator consists of a tank 42 placed at a suitable elevation, into the top of which the stream of non-miscible liquids flows through a conduit 50. An oil discharge pipe 43 communicates with the receptacle near the top and a water discharge pipe 44 near the bottom thereof. The latter pipe is preferably formed as a siphon so as to delay the discharge from said tank until the latter is partly full, giving the non-miscible liquids a chance to separate by gravity before being discharged.

Separate meters 48 and 49 are intercalated in the discharge conduits, from the readings of which the proportionate flows of oil and water may be ascertained. The oil may be received into tanks 46, while the water may be wasted or incidentally utilized.

While we have in the above description disclosed what we believe to be preferred and practical embodiment of my invention, it is to be understood that the specific details described are not limitative in their effect upon the invention, but merely illustrative except in so far as they are expressly prescribed by the terms of the appended claims.

Having thus described the invention, what is claimed is:

1. A gravity meter for liquids including pivotally mounted oscillatory means, a nozzle discharging liquid into said means adjacent its pivotal axis, said nozzle extending in a horizontal direction and being flared outwardly for distributing liquid at a distance on both sides of said pivotal axis to increase the inertia of the liquid in its descent toward the lower end of said means, vessels into which said receiving means alternately discharges, means responsive to a definite depth of liquid in said vessel for oscillating said first mentioned means, discharge valves for said vessels, and means for alternately actuating said valves, said last mentioned means moving independently of said valve during the initial part of each oscillatory movement, whereby to gather inertia and to deliver a hammer blow to said valves for opening the latter.

2. A gravity meter for liquids including oscillatorily mounted means receiving liquid from a source of supply, vessels through which said receiving means alternately discharges, floats, means suspending said floats from opposite ends of said receiving means, said floats being responsive to definite depths of liquid in said vessels, so that when one of said vessels become sufficiently filled, the respective float tilts said receiving means downwardly toward the end opposite said float, said vessels being provided with discharge openings, valves controlling said discharge openings and having stems, yokes carried by said float suspending means and freely engaging the stems of said valves, said yokes being slidable relatively to said valve stems during the initial movement of said receiving means, whereby the latter gathers inertia, and means on said valve stems enagageable by said yokes, for suddenly opening said valves, said last mentioned means being adjustable to regulate the lost motion between said valve stems and yokes.

3. A gravity meter for liquids including oscillatorily mounted means receiving liquid from a source of supply, vessels into which said receiving means alternately discharges, said vessels being provided with discharge openings, floats, means suspending said floats from opposite ends of said receiving means, said floats being responsive to definite depths of liquid in said vessels so that when one of said floats becomes sufficiently inundated the receiving means tilts downwardly toward the end opposite said float, means for adjusting said float relative to said receiving means, valves controlling the discharge openings in said vessels and having stems, yokes carried by said float suspending means and freely engaging the stems of said valve, said yokes being slidable relatively to said valve stems during the initial tilting movement of said receiving means, whereby the latter gathers inertia, means on said valve stems alternately engageable by said yokes after the aforesaid free initial movement of the latter for suddenly opening said valves, said last mentioned means being adjustable to regulate the lost motion between said valve stem and yokes, an oscillation registering mechanism, and means connecting the receiving means to said registering mechanism.

In testimony whereof we affix our signatures.

CHARLES H. BERGQUIST.
RICHARD BATTLE.